(12) United States Patent
Malstrom et al.

(10) Patent No.: US 9,724,831 B2
(45) Date of Patent: Aug. 8, 2017

(54) ROBOTIC GRIPPER MECHANISM

(71) Applicant: TYCO ELECTRONICS CORPORATION, Berwyn, PA (US)

(72) Inventors: Charles Randall Malstrom, Lebanon, PA (US); Swapnilsinh Solanki, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 14/839,062

(22) Filed: Aug. 28, 2015

(65) Prior Publication Data

US 2017/0057101 A1 Mar. 2, 2017

(51) Int. Cl.
| | | |
|---|---|---|
| *B66F 19/00* | (2006.01) | |
| *B25J 15/08* | (2006.01) | |
| *B25J 19/06* | (2006.01) | |

(52) U.S. Cl.
CPC .............. *B25J 15/08* (2013.01); *B25J 19/063* (2013.01)

(58) Field of Classification Search
CPC .... A01B 1/18; A01B 1/16; B25G 3/02; B66C 1/32; B66C 1/422; B25J 15/0009; B25J 15/08; H01L 21/68707; B65G 47/90; B65D 71/50
USPC ........................................................ 294/218
See application file for complete search history.

(56) References Cited

U.S. PATENT DOCUMENTS

| | | | |
|---|---|---|---|
| 2,743,954 A * | 5/1956 | Ostlund .................. | B66C 1/422 294/106 |
| 3,086,808 A * | 4/1963 | Kaplan ..................... | B66C 1/24 294/106 |
| 4,576,407 A * | 3/1986 | Lambert ................. | B25J 15/022 294/195 |
| 5,338,150 A | 8/1994 | Focke et al. | |
| 6,412,844 B1 | 7/2002 | Hendzel | |
| 8,376,433 B2 * | 2/2013 | Wegener ................. | B65B 35/36 294/106 |
| 2006/0181092 A1 | 8/2006 | Kikut et al. | |
| 2013/0088031 A1* | 4/2013 | Jones et al. ........ | G01N 35/0099 294/203 |

FOREIGN PATENT DOCUMENTS

| | | |
|---|---|---|
| JP | S60-29489 U | 2/1985 |
| JP | S61-226233 A | 10/1986 |
| JP | 2007-222971 A | 9/2007 |
| JP | 2011-056595 A | 3/2011 |

OTHER PUBLICATIONS

European Search Report dated Jan. 30, 2017, for European Patent Application No. 16185068.0.

* cited by examiner

*Primary Examiner* — Stephen Vu

(57) ABSTRACT

A robotic gripper mechanism has a housing, a gripper arm and a retention projection. The gripper arm extends from the housing. The gripper arm has a gripper finger provided at a distal end thereof. The retention projection is provided on the housing and cooperates with the gripper arm to exert a retention force on the gripper arm. Wherein when an external force is applied to the gripper finger in a direction which is parallel to a longitudinal axis of the housing, the gripper arm will move relative to the housing if the external force is greater than the retention force.

19 Claims, 5 Drawing Sheets

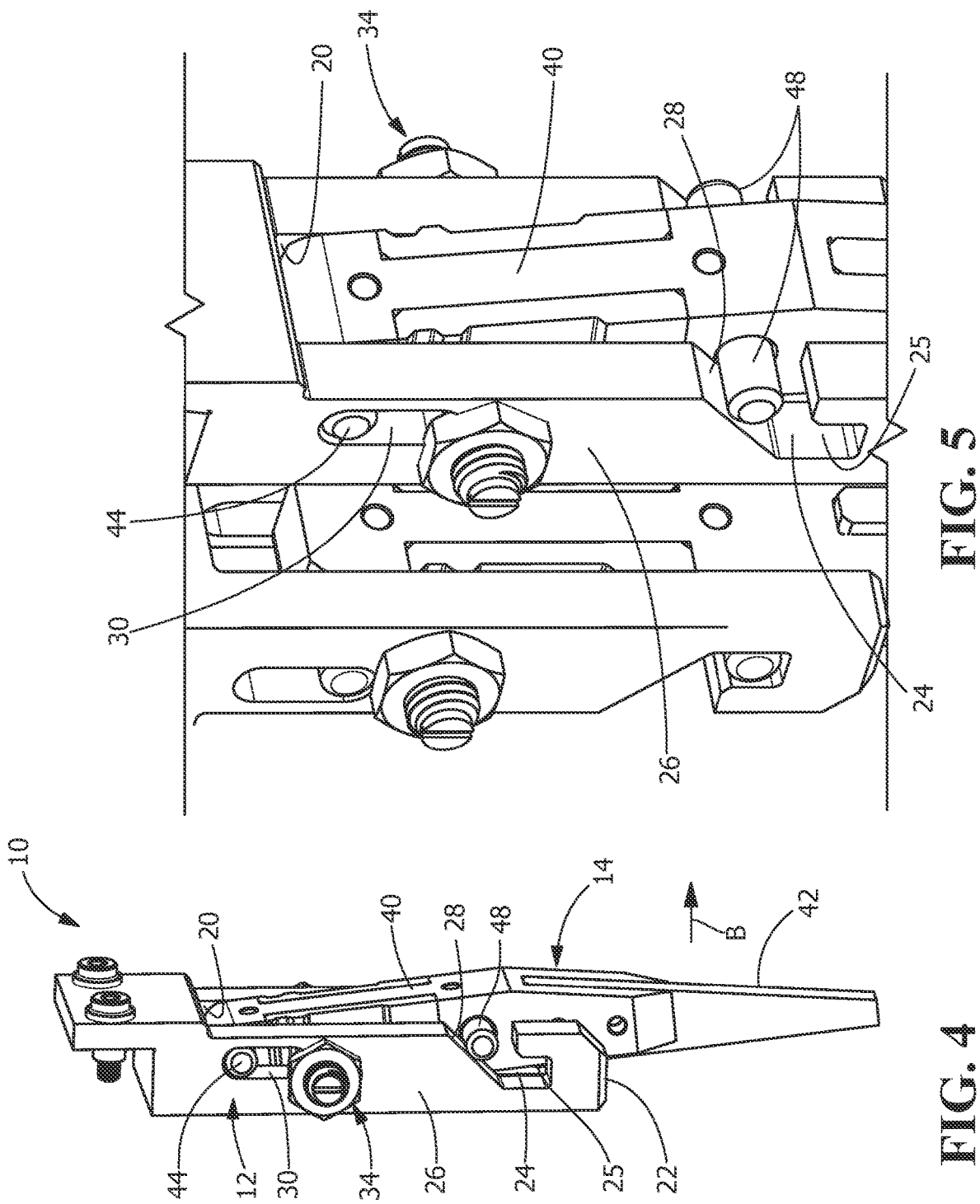

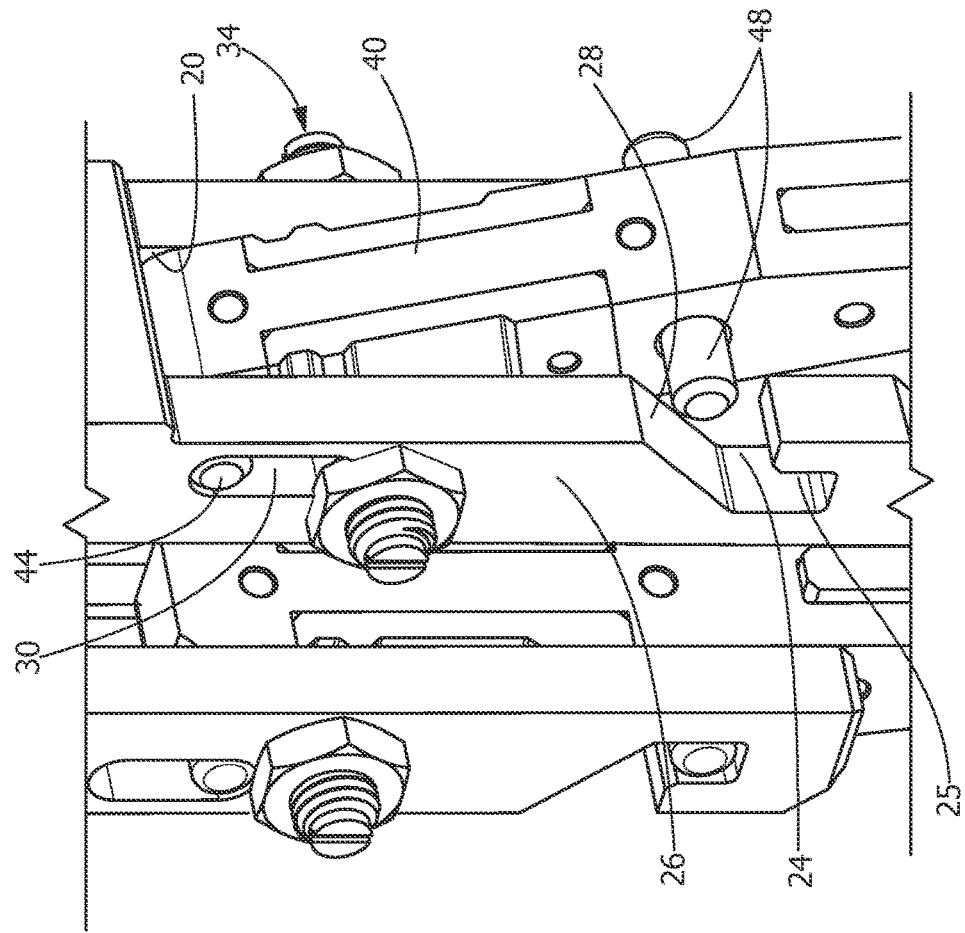
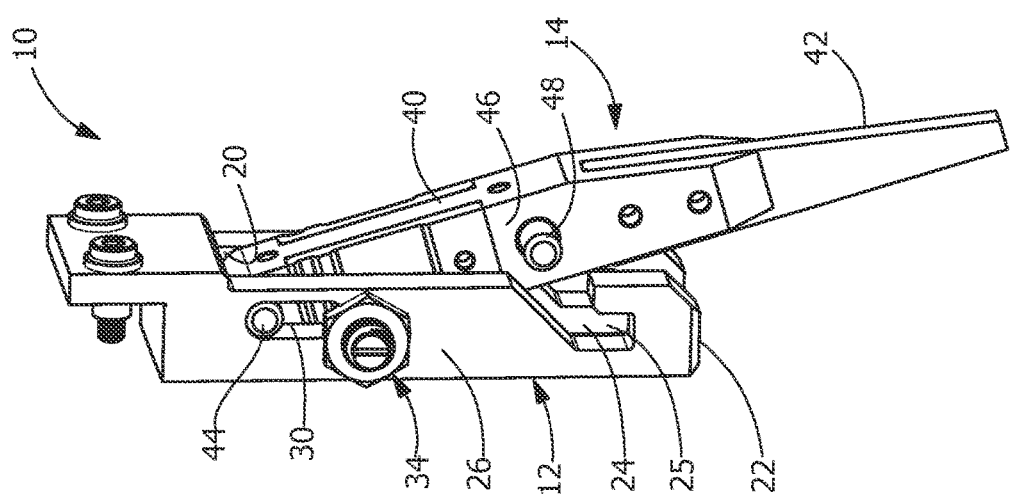
FIG. 7
FIG. 6

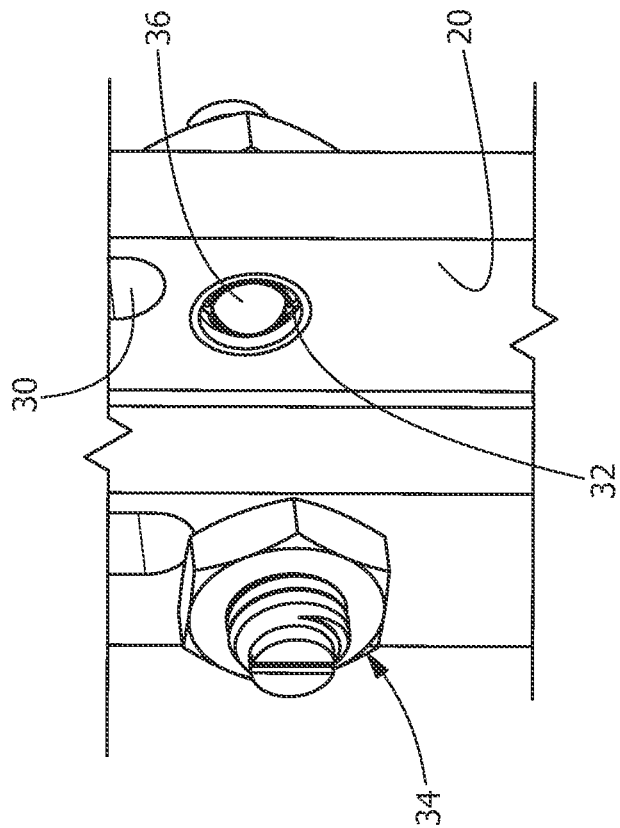
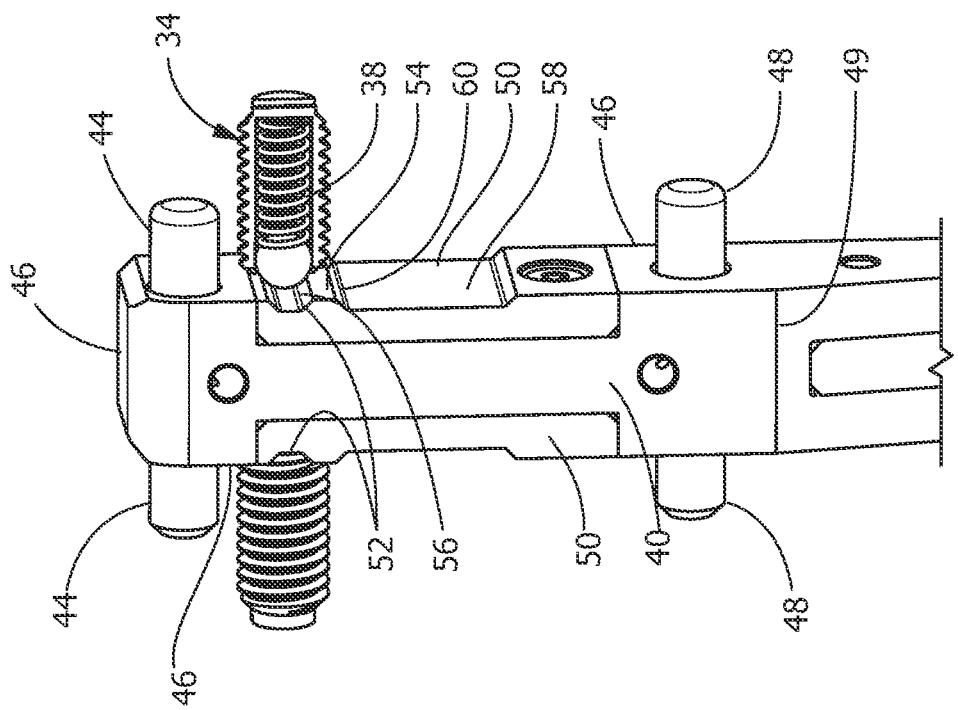
FIG. 9
FIG. 8

ROBOTIC GRIPPER MECHANISM

FIELD OF THE INVENTION

This invention relates to robotic gripper mechanism and more particularly to a robotic gripper mechanism for use in manipulating selected objects or parts. In particular, the invention relates to robotic gripper mechanism which allows portions of the gripper mechanism to be displaced when unwanted forces are encountered.

BACKGROUND OF THE INVENTION

There are many applications in industry or institutions where robotic mechanisms are used to manipulate parts or objects. Frequently, the areas of operation for such robotic mechanisms are very tight. When operating in tight areas, the mechanism may inadvertently strike an object when being lowered into a pickup position. Since the gripper mechanisms are frequently being moved at relatively high speed to achieve good throughput rate, such inadvertent striking of an obstruction in a mechanism path may cause significant damage to the gripper mechanism, resulting in a costly shutdown of the entire system in which it is being utilized and may also damage the object providing the obstruction.

It is therefore desirable that a simple and inexpensive mechanism be provided to protect the gripper mechanism and prevent damage thereto in the event an obstruction is inadvertently encountered when the gripper mechanism is being lowered into an operative position.

SUMMARY OF THE INVENTION

An object is to provide a gripper mechanism with a gripper arm and/or finger which can be moved relative independent of the remainder of the gripper mechanism in the event an object or obstruction is inadvertently encountered when the gripper mechanism is being lowered into an operative position, thereby preventing damage to the gripper finger, the gripper mechanism and the object.

An object is to provide a gripper mechanism with a gripper arm and/or finger which can be moved relative independent of the remainder of the gripper mechanism in the event an external force, which is greater than a retention force of the gripper finger, is applied to the gripper finger in a direction which has a component parallel to a longitudinal axis of the housing, thereby preventing damage to the gripper finger, the gripper mechanism and the object.

An embodiment is directed to a gripper mechanism for use with a robotic positioning system. The gripper mechanism includes a housing, a gripper arm and a retention projection. The gripper arm extends from the housing. The gripper arm has a gripper finger provided at a distal end thereof. The retention projection is provided on the housing and cooperates with the gripper arm to exert a retention force on the gripper arm. Wherein when an external force is applied to the gripper finger in a direction which is parallel to a longitudinal axis of the housing, the gripper arm will move relative to the housing if the external force is greater than the retention force.

An embodiment is directed to a gripper mechanism for use with a robotic positioning system. The gripper mechanism includes a housing, a gripper arm and a retention projection. The housing has a gripper arm receiving slot. The gripper arm extends from the housing and has a mounting portion and a gripper finger provided at a distal end thereof. The mounting portion is moveably positioned in the a slot of the housing. The retention projection is provided on the housing and cooperates with the gripper arm to exert a retention force on the gripper arm. Wherein when an external force is applied to the gripper finger in a direction which is parallel to a longitudinal axis of the housing, the gripper arm will move relative to the housing if the external force is greater than the retention force.

An embodiment is directed to a gripper mechanism for use with a robotic positioning system. The gripper mechanism includes a housing which has a gripper arm receiving slot, a projection receiving opening and a pin receiving recess. A gripper arm extends from the housing and has a mounting portion and a gripper finger provided at a distal end thereof. The mounting portion is moveably positioned in the a slot of the housing. A spring loaded retention projection is provided on the housing. The retention projection cooperates with the mounting portion of the gripper arm to exert a retention force on the gripper arm. A pivoting projection is provided proximate an end of the mounting portion which is removed from the gripper finger. The pivoting projection is received in the projection receiving opening. A stabilizing projection is provided proximate an end of the mounting portion which is proximate to the gripper finger. The stabilizing projection is received in the pin receiving recess. Wherein when an external force is applied to the gripper finger in a direction which is parallel to a longitudinal axis of the housing, the gripper arm will move relative to the housing if the external force is greater than the retention force.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 4 is a perspective view of one of the gripper mechanisms of FIG. 1 showing the gripper arm in a partially displaced position in which the gripper arm has been moved in direction both parallel to and perpendicular to the longitudinal axis of a housing of the gripper mechanism.

FIG. 5 is an enlarged perspective view of the mounting portion of the gripper arm of FIG. 4.

FIG. 6 is a perspective view of one of the gripper mechanisms of FIG. 1 showing the gripper arm in a fully displaced position in which the gripper arm has been moved in direction both parallel to and perpendicular to the longitudinal axis of a housing of the gripper mechanism.

FIG. 7 is an enlarged perspective view of the mounting portion of the gripper arm of FIG. 6.

FIG. 8 is a perspective view of the mounting portion of the gripper arm, with a portion of a housing of a projection removed.

FIG. 9 is an enlarged perspective view of the moveable projection and the gripper arm receiving slot of the housing of the gripper mechanism.

DETAILED DESCRIPTION OF THE INVENTION

Figure 1:
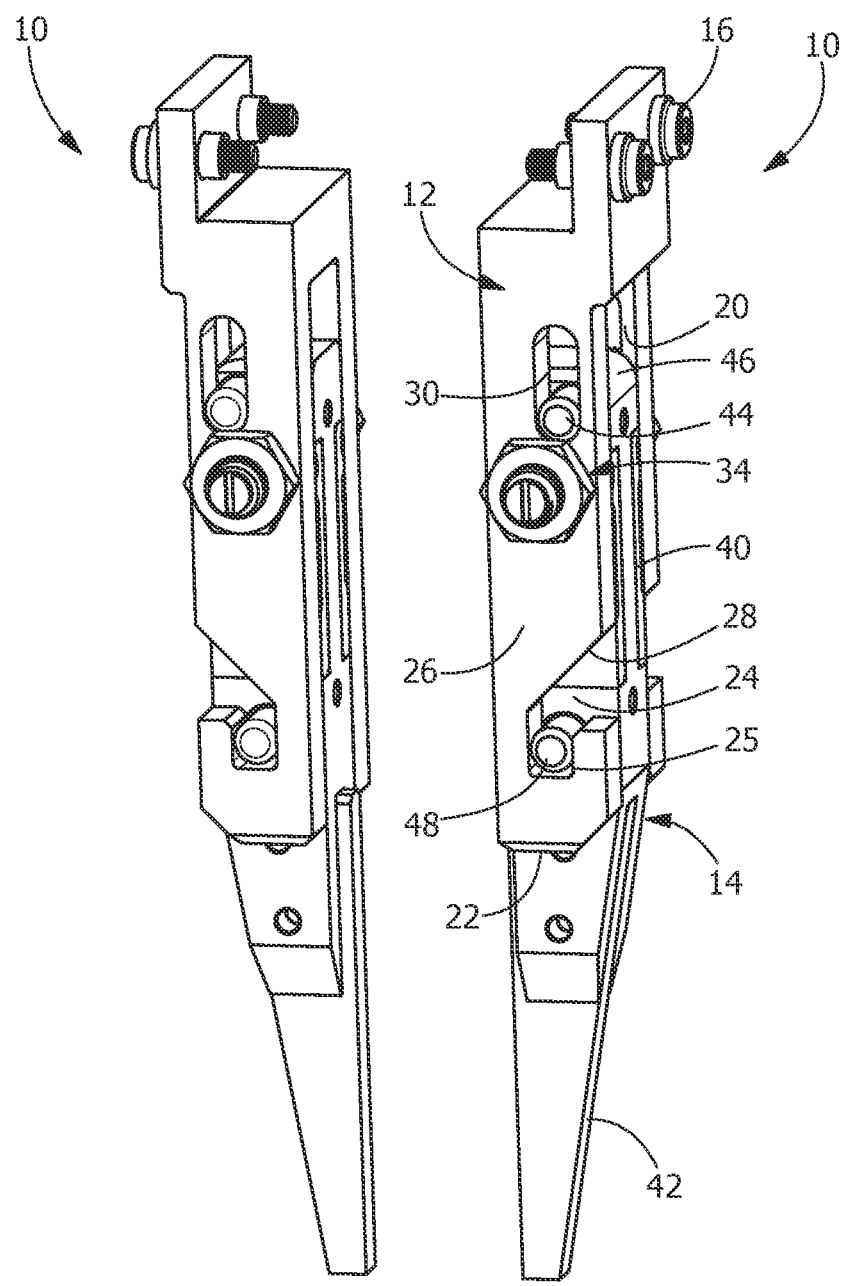
FIG. 1 is a perspective view of two illustrative gripper mechanisms shown in an initial position.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Referring first to FIG. 1, a gripper mechanism 10 is shown having a housing 12 with an extending or gripper arm 14. Housing 12 is mounted, for example by one or more bolts 16, to a suitable robotic positioning system (not shown), which system is preferably capable of moving in three dimensions to position mechanism 10 over an object or part to be manipulated, allowing the arm 14 into position to grip the object or part. The specifics of such robotic positioning systems are not part of this invention, and any suitable robotic positioning system, either currently existing or developed in the future, may be utilized for performing the positioning function.

The housing 12 has a gripper arm receiving elongated slot or recess 20 for receiving a portion of the arm 14 therein. The slot 20 extends through the bottom wall 22 of the housing 12. Pin receiving recesses 24 extend through sidewalls 26 of the housing 12 to the arm receiving slot 20. The pin receiving recesses 24 have pockets 25 and camming surfaces or ramps 28. The camming surfaces or ramps 28 are angled relative to the longitudinal axis of the housing 12. The camming surfaces or ramps 28 may be configured at different angles with respect to the longitudinal axis of the housing 12. Elongated pin or projection receiving openings 30 are spaced from the pin receiving recesses 24. The elongated projection receiving openings 30 extend through sidewalls 26 of the housing 12 to the arm receiving slot 20 and are dimensioned to receive pins or projections therein, while allowing the pins or projections to move in a direction parallel to the longitudinal axis of the housing 12. Mounting opening 32 (FIG. 9) extend through sidewalls 26 of the housing 12 to the arm receiving slot 20. In the illustrative embodiment shown, the mounting openings 32 are positioned between the pin receiving recesses 24 and the elongated projection receiving openings 30. However, the mounting openings 32 may located in other positions, such as, but not limited to, below the pin receiving recesses 24 or above the projection receiving openings 30.

As best shown in FIGS. 8 and 9, spring loaded or moveable retention projection 34 are cooperate with the housing 12 and are positioned in and extend through mounting openings 32. In the embodiment shown, the moveable projections 34 includes an arcuate member or ball 36 and a spring 38. The spring 38 resiliently biases or spring loads the arcuate member or ball 36 into the arm receiving slot 20 of the housing 12. While the spring loaded or moveable projection 34 is shown as a spring loaded ball mechanism, other types of projections can be used without departing from the scope of the invention.

Figure 3:
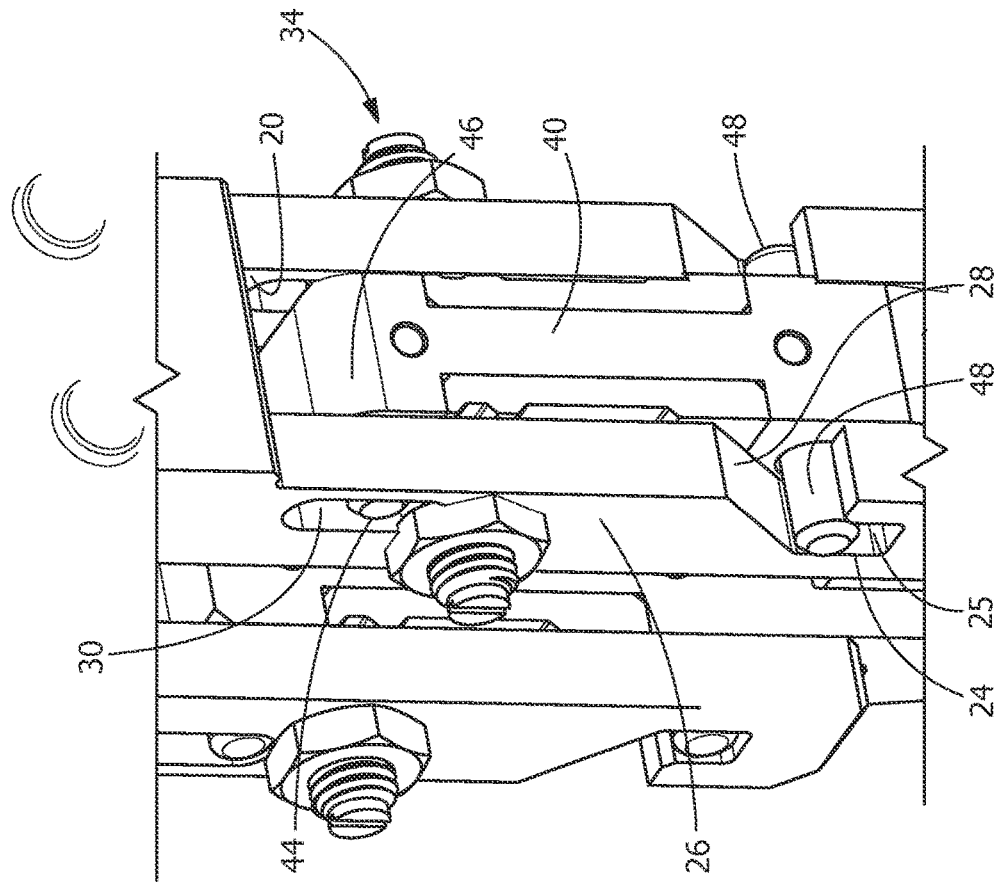
FIG. 3 is an enlarged perspective view of the mounting portion of the gripper arm of FIG. 2.
Figure 2:
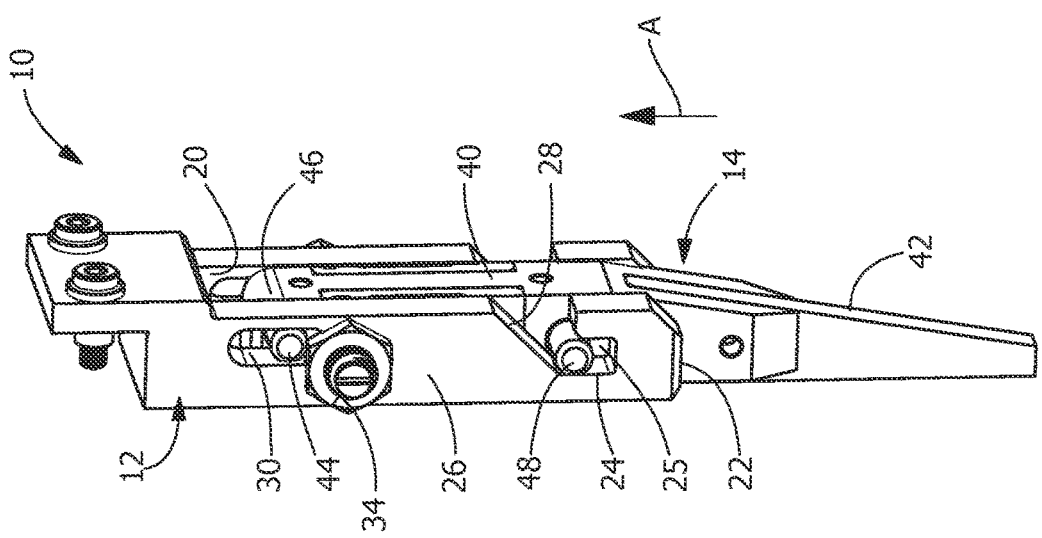
FIG. 2 is a perspective view of one of the gripper mechanisms of FIG. 1 showing the gripper arm in a partially displaced position in which the gripper arm has been moved in direction parallel to the longitudinal axis of a housing of the gripper mechanism.

As shown in FIGS. 1 through 3, the gripper arms 14 have mounting portions 40 which cooperate with the housing 12. The mounting portions 40 are moveably positioned in the arm receiving elongated slots 20 and are dimensioned to be moveable relative to the slots 20, as will be more fully described. Gripper fingers 42 extend from the mounting portions 40 and are positioned at a distal end of the gripper arms 14. The gripper fingers 42 extend below the arm receiving elongated slots 20. In the embodiment shown, the mounting portions 40 and the gripper fingers 42 are separate members which are attached using known attachment methods. However, the gripper fingers 42 may be integrally molded or manufactured with the mounting portions 40 without departing from the scope of the invention.

The mounting portions 40 have pivoting projections or pins 44 provided proximate ends 46 of the mounting portions 40 which are removed from the gripper fingers 42. The pins 44 extend from sidewalls 26 of the mounting portions 40 and are received in respective elongated projection receiving openings 30. The pins 44 are dimensioned to be moveable in the openings 30 in a direction which is parallel to the longitudinal axis of the housing 12. Stabilizing projections or pins 48 are provided proximate ends 49 of the mounting portions 40 which are proximate to or adjacent the gripper fingers 42. The pins 48 extend from sidewalls 46 of the mounting portions 40 and are received in respective pin receiving recesses 24. The pins 48 are dimensioned to be moveable in the recesses 24, as will be more fully described.

As best shown in FIG. 8, mounting portions 40 include cam plates 50. In the embodiment shown, the cam plates are separate members which are attached to the mounting portions using known attachment methods. However, the cam plates may be integrally molded or manufactured with the mounting portions without departing from the scope of the invention. Cam plates 50 include recesses 52 for receiving the spring loaded or moveable projection 34 therein. Projections 54 are provided proximate to or adjacent recesses 52. Camming or ramp surfaces 56 extend from bottom surfaces of the recesses 52 to the projections 54. Depending upon the amount of resistance desired, as will be more fully described, the ramps 56 may be configured at different angles with respect to the longitudinal axis of the mounting portions 40. Second recesses 58 are provided proximate to or adjacent projections 54. The second recesses 58 extend from the projections 54 in an opposed direction from the first recesses 52. Ramps or shoulders 60 extend from the projections 54 to the bottom surfaces of the recesses 58.

Referring again to FIG. 1, two gripper mechanisms 10 are shown in an initial position. In this position, the pins 44 are positioned in the opening 30. The pins 44 are positioned proximate to or in engagement with a bottom surface of the opening. The pins 48 are positioned in the pockets 25 of the recess 24. The positioning of the pins 48 in the pockets 25 prevents the grasping fingers 42 and arms 14 from initially being moved relative to the housing 12 in any direction other than parallel to the longitudinal axis of the housing 12. However, in the initial position, the spring loaded or moveable projection 34 are positioned in the recess 52 to prevent or inhibit the movement of the grasping fingers 42 and arms 14 in a direction which is parallel to the longitudinal axis of the housing 12.

In use, the gripper arms 14 are moved from a first position to a second position, in which the grasping fingers 42 are moved into engagement with objects or parts to be manipulated. As this occurs, and if no unwanted obstacle is encountered, the gripper arms 14 are maintained in the initial position relative to the housing 12, as shown in FIG. 1, thereby allowing the grasping fingers 42 to engage and manipulate the object or part.

If at any time during a downward motion of arm 14, an obstacle is encountered, pressure or force is applied by such obstacle to the bottom of one or more respective gripper finger 42. As this occurs, the pressure or force is transferred through the gripper finger 42 to the arm 14. If the pressure or force applied by the obstacle is less than the retention force exerted by the spring loaded or moveable projections 34, the arm 14 is maintained in position relative to the housing 12, as shown in FIG. 1, allowing the grasping finger 42 to be moved into engagement with objects or parts to be manipulated. As this occurs, the gripper mechanisms 10 are maintained in the initial position, thereby allowing the grasping fingers 42 to engage and manipulate the object or part.

If the pressure or force applied by the obstacle is greater than the retention force exerted by the spring loaded or moveable projections 34, the arm 14 is moved is the direction parallel to the longitudinal axis of the housing 12, as represented by arrow A in FIG. 2. As this occurs, the spring loaded or moveable projections 34 are moved from the recesses 52 and into engagement with the ramps 56. This causes the spring loaded or moveable projections 34 to resiliently retract, allowing for the continued movement of the arm 14 relative to the housing 12. This movement continues until the stabilizing projections or pins 48 are moved into engagement with the camming surfaces 28. As this occurs, or approximately when this occurs, the spring loaded or moveable projections 34 is moved passed projections 54 into second recesses 58. This allows the gripper finger 42 and the arm 14 to be moved upward as a result of such force, preventing any damage to the arm 14 and the gripper finger 14 at the distal end thereof. This movement also helps to prevent damage to the obstacle that was encountered.

If the pressure or force applied by the obstacle is continued, the arm 14 is continued to be move moved in the direction parallel to the longitudinal axis of the housing 12. However, as the pins 48 engage the camming surfaces 28, the continued force causes the pins 48 and the arm 14 to have a movement component in a direction which is perpendicular to the longitudinal axis of the housing 12, as represented by arrow B in FIG. 4. This causes the gripper finger 42 and the arm 14 to pivot or rotate about the pins 44, allowing the gripper finger 42 to be moved away from the longitudinal axis of the housing 12. This allows the gripper finger 42 and the arm 14 to be moved upward and outward as a result of such force, as shown in FIGS. 6 and 7, preventing any damage to the arm 14 and the gripper finger 42 at the distal end thereof. This movement also helps to prevent damage to the obstacle that was encountered.

The gripper arm may be moved relative to or independent of the remainder of the gripper mechanism in the event an object or obstruction is inadvertently encountered when the gripper mechanism is being lowered into an operative position, thereby preventing damage to the gripper finger, the gripper mechanism (which includes, but is not limited to, the gripper actuator) and the object. In addition, in the event an external force, which is greater than a retention force of the gripper finger, is applied to the gripper finger in a direction which has a component parallel to a longitudinal axis of the housing, perpendicular to a longitudinal axis of the housing, or both, the gripper finger is displaced, thereby preventing damage to the gripper finger, the gripper mechanism and the object.

The gripper mechanism provides a simple and inexpensive mechanism to protect the gripper mechanism and prevent damage thereto in the event an obstruction or obstacle is inadvertently encountered when the gripper mechanism is being lowered into an operative position.

Gripper fingers 42 may be a single finger of a length and shape appropriate for the application, or may be two or more fingers. In addition, while various projections have been shown extending between the housing 12 and the arm 14, these are by way of illustration only, and other suitable projections and/or mechanisms may be utilized, depending on application and other factors. Other details of construction may also vary with application. It should also be noted that, while two gripper mechanism 10, are shown in the figures, different numbers of gripper mechanism may be required to lift or manipulate the object or part.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A gripper mechanism for use with a robotic positioning system, the gripper mechanism comprising:
   a housing;
   a gripper arm extending from the housing, the gripper arm having a gripper finger provided at a distal end thereof, the gripper arm having a mounting portion which is moveably positioned in a slot of the housing, the gripper finger extending from the mounting portion below the slot;
   the mounting portion has a pivoting projection, the pivoting projection is received in a projection receiving opening;

a retention projection which cooperates with the housing, the retention projection cooperates with the gripper arm to exert a retention force on the gripper arm;

wherein when an external force is applied to the gripper finger in a direction which is parallel to a longitudinal axis of the housing, the gripper arm will move relative to the housing if the external force is greater than the retention force.

2. The gripper mechanism as recited in claim 1, wherein the retention projection is a spring loaded projection positioned in and extending through a mounting opening of the housing.

3. The gripper mechanism as recited in claim 2, wherein the spring loaded projection is an arcuate member with a spring which resilient biases the arcuate member into an arm receiving slot of the housing to engage the gripper arm.

4. The gripper mechanism as recited in claim 2, wherein the mounting portion has a cam plate with a recess for receiving the retention projection therein.

5. The gripper mechanism as recited in claim 4, wherein the cam plate has a projection provided proximate to the recess, a ramp surface extends from the recess to the projection.

6. The gripper mechanism as recited in claim 1, wherein the retention projection is a moveable projection positioned in and extending through a mounting opening of the housing.

7. The gripper mechanism as recited in claim 5, wherein the pivoting projection is provided proximate an end of the mounting portion which is removed from the gripper finger.

8. The gripper mechanism as recited in claim 1, wherein the projection receiving opening has an elongated configuration, wherein the pivoting projection is moveable in the projection receiving opening in a direction which is parallel to the longitudinal axis of a housing.

9. The gripper mechanism as recited in claim 8, wherein a stabilizing projection is provided proximate an end of the mounting portion which is proximate to the gripper finger, the stabilizing projection is received in a pin receiving recess.

10. The gripper mechanism as recited in claim 9, wherein the pin receiving recess extends through the housing to the slot, the pin receiving recess has a pocket which retains the stabilizing projection therein when the gripper arm is in an initial position.

11. The gripper mechanism as recited in claim 10, wherein the pin receiving recess has a camming surface which is angled relative to the longitudinal axis of the housing.

12. A gripper mechanism for use with a robotic positioning system, the gripper mechanism comprising:
  a housing having a gripper arm receiving slot;
  a gripper arm extending from the housing, the gripper arm having a mounting portion and a gripper finger provided at a distal end thereof, the mounting portion moveably positioned in the slot of the housing;
  a retention projection which cooperates with the housing, the retention projection cooperates with the gripper arm to exert a retention force on the gripper arm;
  a stabilizing projection provided on the mounting portion, the stabilizing projection is received in a pin receiving recess;

wherein when an external force is applied to the gripper finger in a direction which is parallel to a longitudinal axis of the housing, the gripper arm will move relative to the housing if the external force is greater than the retention force.

13. The gripper mechanism as recited in claim 12, wherein the retention projection is a spring loaded projection positioned in and extending through a mounting opening of the housing.

14. The gripper mechanism as recited in claim 12, wherein the mounting portion has a pivoting projection provided proximate an end of the mounting portion which is removed from the gripper finger, the pivoting projection is received in a projection receiving opening.

15. The gripper mechanism as recited in claim 14, wherein the projection receiving opening has an elongated configuration, wherein the pivoting projection is moveable in the projection receiving opening in a direction which is parallel to the longitudinal axis of a housing.

16. The gripper mechanism as recited in claim 12, wherein the stabilizing projection is provided proximate an end of the mounting portion which is proximate to the gripper finger.

17. The gripper mechanism as recited in claim 12, wherein the pin receiving recess extends through the housing to the slot, the pin receiving recess has a pocket which retains the stabilizing projection therein when the gripper arm is in an initial position.

18. The gripper mechanism as recited in claim 12, wherein the pin receiving recess has a camming surface which is angled relative to the longitudinal axis of the housing.

19. A gripper mechanism for use with a robotic positioning system, the gripper mechanism comprising:
  a housing having a gripper arm receiving slot, a projection receiving opening and a pin receiving recess;
  a gripper arm extending from the housing, the gripper arm having a mounting portion and a gripper finger provided at a distal end thereof, the mounting portion moveably positioned in the a slot of the housing;
  a spring loaded retention projection which cooperates with the housing, the retention projection cooperates with the mounting portion of the gripper arm to exert a retention force on the gripper arm;
  a pivoting projection provided proximate an end of the mounting portion which is removed from the gripper finger, the pivoting projection received in the projection receiving opening;
  a stabilizing projection provided proximate an end of the mounting portion which is proximate to the gripper finger, the stabilizing projection received in the pin receiving recess;
  wherein when an external force is applied to the gripper finger in a direction which is parallel to a longitudinal axis of the housing, the gripper arm will move relative to the housing if the external force is greater than the retention force.

* * * * *